April 28, 1970   S. E. POLCHLOPEK ET AL   3,508,836
CELL FOR INFRARED SPECTROSCOPY Filed May 4, 1965   2 Sheets-Sheet 1

INVENTORS.
STANLEY E. POLCHLOPEK
ROBERT L. HARRIS
BY

Robert Ames Norton
ATTORNEY

April 28, 1970  S. E. POLCHLOPEK ET AL  3,508,836
CELL FOR INFRARED SPECTROSCOPY
Filed May 4, 1965  2 Sheets-Sheet 2

INVENTORS.
STANLEY E. POLCHLOPEK
ROBERT L. HARRIS
BY
Robert Hunes Norton
ATTORNEY

United States Patent Office 3,508,836
Patented Apr. 28, 1970

3,508,836
CELL FOR INFRARED SPECTROSCOPY
Stanley E. Polchlopek, Wilton, and Robert L. Harris, Bethel, Conn., assignors to Barnes Engineering Company, Stamford, Conn., a corporation of Delaware
Filed May 4, 1965, Ser. No. 453,030
Int. Cl. G01n 1/10; C23c 13/08
U.S. Cl. 356—246
2 Claims

ABSTRACT OF THE DISCLOSURE

A process and apparatus for obtaining gaseous or non-gaseous pyrolyzate samples of materials for infrared analysis is described. The collecting devices or cells are of two types: For non-gaseous pyrolyzates which at ordinary temperature may be liquid or partially solid the cell is provided with a heat ribbon having a depression to take the pyrolysis sample and a cover with a hermetically sealable opening taking a pyrolyzate plate which may be an attenuated total reflection plate, one side being exposed to the pyrolysis vapors on the inside and the other coolable. The heater is connectable to a power source and the cell to a source of vacuum with a valve which can be shut after pyrolysis is complete to maintain the vacuum. The gaseous phase pyrolysis cells are similar, but have no opening for a pyrolysis plate. On the other hand, these cells have an infrared window and the connections to the electric power source are plug-in pins. The cell can be evacuated, the sample heated, the valve closed, and the cell then unplugged and inserted in an infrared analytical instrument.

BACKGROUND OF THE INVENTION

In the past it has often been desirable to pyrolyze materials and collecting samples for infrared or other spectral analysis. The problem is most common for infrared analysis and the description in the specification will be in terms of this purpose. However, the instruments are useful for other types of spectral investigation. One of the reasons why pyrolysis of samples is desirable is because many substances such as, for example, rubber with fillers and other polymers do not lend themselves to direct spectral analysis either by transmission or attenuated total reflection including both single and multiple reflection, which in the remainder of this specification will be abbreviated in its customary manner ATR. The materials are often difficult to mount for spectral analysis and the presence of fillers can completely mask the spectral analysis of the organic materials themselves. Accordingly, pyrolysis has been used to decompose the material or depolymerize the polymers and collect the pyrolysate either in liquid or gas form depending on the nature of the material and the type of spectral analysis desired. In general most fillers are not decomposed and, therefore, the resulting spectrum is free from their contribution. In the past this has been effected manually, for example, by placing a small amount of the material in a test tube, heating the material and collecting the pyrolysate either as gas in the upper part of the test tube or as liquid drops on the walls of the upper part of the test tube.

A number of problems have arisen in the manual pyrolysis of which several illustrative ones will be mentioned. Often the materials during pyrolysis are reactive with atmospheric gases, particularly oxygen, and it is extremely difficult or impractical to exclude the presence of such an atmosphere. Another problem in the gas pyrolysate collection is presented by the fact that the vapors have to be retained in the test tube after pyrolysis and this creates stoppering and other problems. A third problem, which is especially serious with liquid pyrolysates, is that the pyrolysate has to be on a particular type of plate for ATR spectral analysis and when ordinary infrared analysis is used, the materials of a test tube may present problems of lack of transparency for the infrared which cuts out portions of the spectrum which are sometimes of importance. Often the sample derived from a pyrolysis in a test tube is also insufficient in volume for transfer to an ATR plate or crystal.

SUMMARY OF THE INVENTION

The present invention solves the problem of producing automatically samples, either liquid or gaseous, with the products of pyrolysis in a form suitable for spectral analytic investigation. Essentially the present invention provides a device with a suitable heating element which can be plugged into a power supply and on which heating element a small amount of the material to be pyrolyzed is placed. The heating element is surrounded by a chamber or container which can receive a gaseous pyrolysate or a chamber having a portion, usually the top portion, provided with a removable element on which liquid pyrolysates can be collected. The chamber is provided with a connection to a source of diminished pressure such as a vacuum pump or aspirator and with a valve which can be open to exhaust or partially exhaust air from the chamber and then maintain the low pressure by closing the valve. The chamber is then plugged in with the power supply and the heating element heated for a predetermined period and at a predetermined temperature resulting in pyrolysis of the sample and collection of the pyrolysate, either as gas or liquid. In the case of the gas cell the walls of the enclosure are of material having suitable transmission for radiations of the wavelength range to be used for spectral investigation. The cell is also of suitable dimensions to fit standard spectrometers or spectrophotometers for analysis.

In the case of the liquid pyrolysate collectors, the collecting element may be a disc of suitable material having the correct radiation transmission which is strongly cooled and on which the pyrolysate collects in drops. The element is then removed, if necessary, provided with a cover in a manner similar to the cover glass of a microscope slide, and is then examined spectrally, either by a spectrophotometer or by ATR. In the latter case, of course, the element must be in the form of a suitably shaped ATR crystal.

Although some kind of a power supply is needed into which the cells can be plugged the particular design of power supply forms no part of the present invention so long as it can furnish electric power for the heating element of the proper voltage and for the proper time. In the specific description of a particular instrument below, the power supply is provided with a conventional timer which turns off the power supply after the predetermined time period and with switches for selecting several different voltages for the heating element, for example, three different voltages. The design of switches and timer are completely conventional and so the present invention is not to be considered as limited to any particular type of power supply although the devices of the present invention require some power supply for operation.

DESCRIPTION OF THE PREFERRED EMBODIMENT

Figure 1:
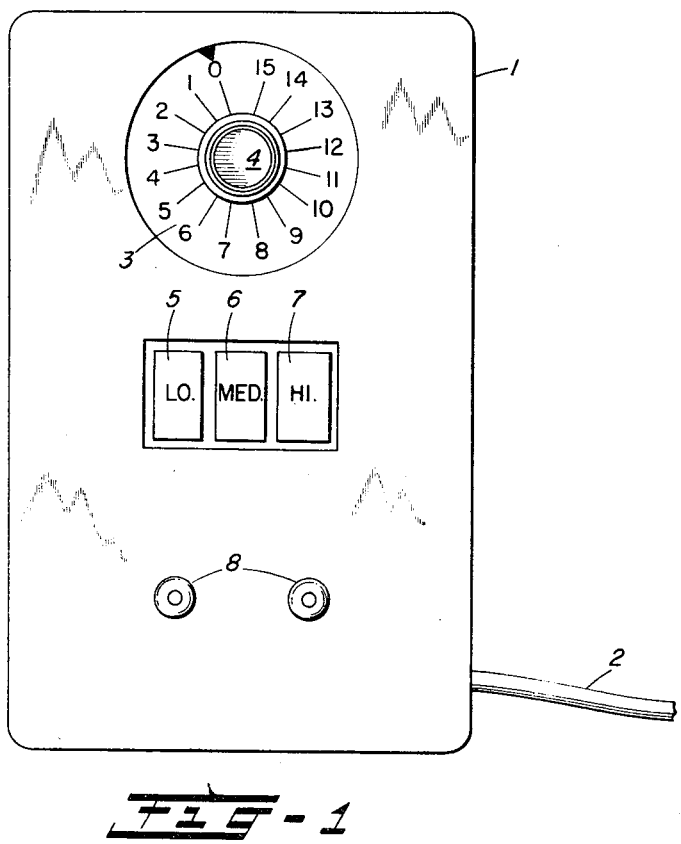
FIG. 1 is a plan view of the top of a typical power supply.

Referring to FIG. 1, the power supply is in a box 1 provided with electric wires 2, a conventional settable timer 3, a starting switch 4, three voltage selecting switches 5, 6 and 7 and two jacks 8. As the elements in the power supply box are completely conventional they are not shown. When the starting switch 4 is depressed after one of the switches 5, 6 or 7 has been actuated for a voltage selection, the selected voltage appears on jacks 8 until the timer 3 has moved through its set time interval at which time, as is normal with timers, the starting switch is thrown back into its original open position.

As has been stated the exact design of the power supply forms no part of the present invention. However, typical values for the power supply are three voltages which, with a standard resistance heating element, produce 450° C., 900 °C. or 1350° C. This choice of temperatures is suitable for most pyrolyses but, of course, where a different temperature is needed in some special case, a modified power supply is provided with a suitable voltage output.

Figure 2:
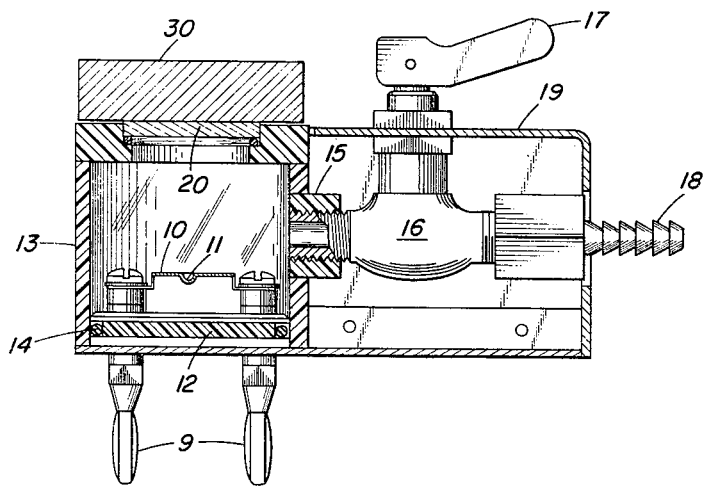
FIG. 2 is a vertical section through a liquid pyrolysate collector for spectrophotometric use.

Turning to FIG. 2 which illustrates a liquid pyrolysate collector, the collector has two pins 9 which plug into the jacks 8. These pins pass through a suitable insulating base 12 and connect to the ends of a ribbon heating element 10 provided with a small depression 11 to receive a sample of the material to be pyrolyzed. The heating element is in a chamber 13 sealed from the insulating base 12 by a suitable gasket 14 in the form of an O-ring. The top of the collecting chamber is provided with a flanged opening in which a disc 20 of suitable transparent material is mounted. For infrared use this may be a suitable salt disc. The chamber is on a common base 28 on which there is mounted a cover 19 which communicates with the chamber 13 through the channel 15. This cover which forms a second chamber is provided with a suitable vacuum valve 16 actuated by a handle 17 and provided with a serrated connecting end 18 projecting beyond the cover 19. The serrated projecting channel is suitable for attachment to elastic tubing from a source of diminished pressure (not shown). Of course, if the source utilizes a hose with a different coupling the element 18 must be provided with the proper design of coupling. These features are conventional and, therefore, only the rubber hose form is shown by way of illustration.

A block 30 of material preferably at a very low temperature, for example, a metal block which has been cooled in liquid nitrogen or a thermoelectric cooler is placed on the disc 20 cooling it down to the desired low temperature. Before the disc 20 has been mounted a sample of the material to be pyrolyzed is placed in the depression 11. After plugging in the collector in the jacks 8 of the power supply, the switch 4 is closed and the element 10 is heated up to the temperature selected by the particular switch 5, 6 or 7 which is depressed and for the time during which the timer is set to operate. Typically the latter may be about 10 seconds and a typical dimension of the disc 20 is a circular disc of 25 mm. diameter. The small sample of material in the depression 11 is pyrolyzed and the condensable vapors are condensed on the cold disc 20. Before the operation is started, the lever 17 is thrown to the open position and the atmosphere in the chamber 13 is reduced to the desired sub-atmospheric pressure whereupon the valve 16 is closed.

After collection of the liquid pyrolysate on the cold disc 20 the disc is removed and, if desired, a cover plate of suitable transparent material placed over the pyrolysate droplets. The disc then can be examined by placing in the holder of a conventional infrared spectrophotometer. Typical models of such spectrophotometers have holders which take a 25 mm. disc which is the reason for the choice of device size as described above. The liquid film of pyrolysate between the cover and the disc is then examined spectroscopically and in the case of a recording spectrophotometer, a record of the infrared absorption spectrum produced.

When the sample was of a polystyrene plastic with a filler the spectrum shows no interference by reason of the fillers. For such a plastic the temperature of 900° C. for six seconds is suitable.

Successive pyrolysate samples can be obtained by cleaning off the heater 10 and inserting a new collector disc without unplugging the collector from the power supply. However, in many cases it is more convenient to have a number of collector chambers available so that a number of samples can be examined quickly and in such a case the cells can be unplugged and disconnected from the source of lowered pressure.

Figure 3:
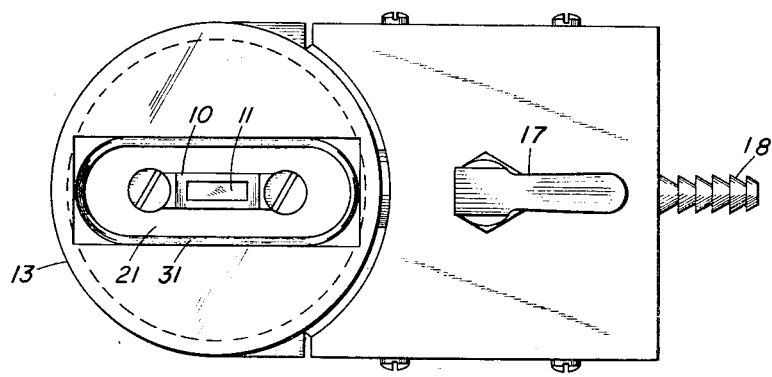
FIG. 3 is a plan view of a modified liquid pyrolysate collector for collecting the pyrolysate on a normal ATR crystal or plate.
Figure 4:
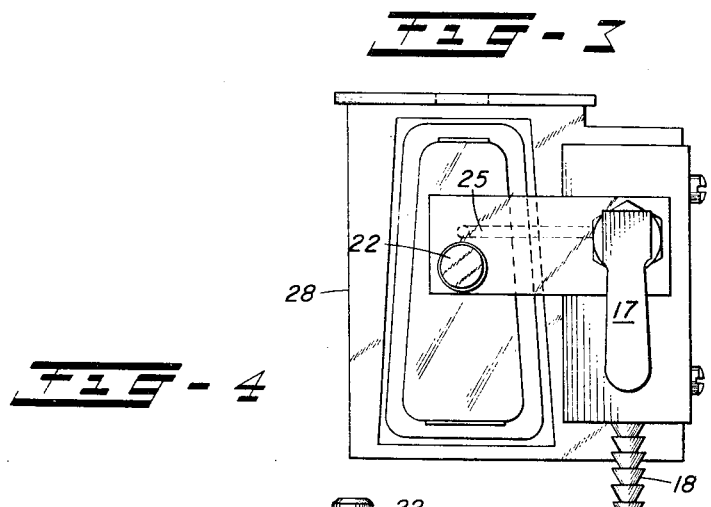
FIG. 4 is a plan view of a gaseous pyrolysate collector.

FIG. 3 illustrates in plan view a cell of the same general design as FIG. 2 but provided with an elongated opening 21 with a gasket 31 to take a typical ATR plate. The same elements bear the same reference numerals as in FIG. 2. When the collecting cell with mounted ATR plate is operated either at room temperature or cooled as described above, a liquid pyrolysate sample is obtained which is then spectrally analyzed by ATR. As only a thin film of the liquid is needed for such an examination the ATR modification presents advantages where the absorption bands of the liquid film do not have to be at all critical in thickness This is sometimes of advantage with certain materials.

A typical example of operation of the collector of FIG. 3 involves the pyrolysis of an epoxy resin. In this case the temperature of 900° C. is used but the time is advantageously set for 10 seconds. An excellent ATR analysis is obtained which would be impossible by ordinary ATR means since too hard and rough a surface is presented by the unpyrolyzed resin. In the chamber referred to above there is a small amount of water vapor produced by the pyrolysis of the epoxy resin and the ATR infrared spectrum, therefore, showed absorption bands for water vapor. As the position of these absorption bands is well known they do not create any confusion in the interpretation of the spectrum produced.

Figure 5:
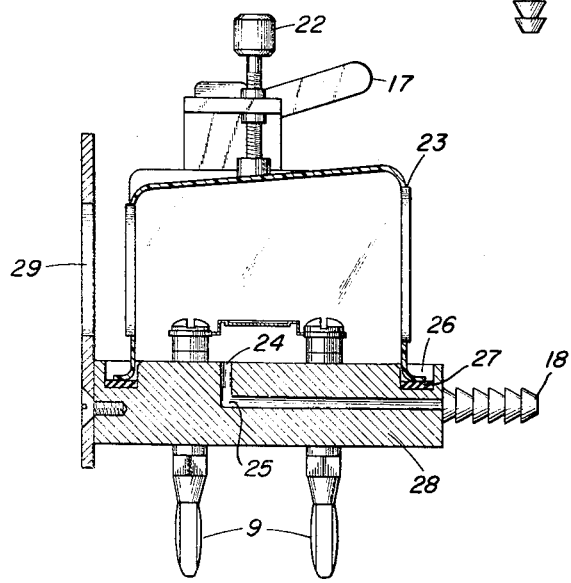
FIG. 5 is a vertical section of FIG. 4.

For vapor pyrolysis the collector shown in FIG. 5 is used plugging in as described and, of course, evacuating as has been described. A different form of container is present, namely a thin plastic container 23 which mounts in a suitable groove 26 of the base 28, a tight seal being assured by the gasket 27 and the hold down screw 22. The vacuum chamber 19 is connected through a channel 25 in the base and an opening 24. The base 28 also contains an extension with a window opening 29 to fit into a gaseous infrared spectrophotometer. The operation is the same as with the cells for collecting liquid pyrolysates but, of course, there is no cold disc or plate and the container 23 is filled with the vapors of the pyrolyzed material. The pyrolysis is often accompanied by smoke which should be allowed to settle for a few minutes before making the spectrophotometric analysis. In this case the whole collector is unplugged from the jacks 8 and is mounted in the spectrophotometer.

Three vapor phase pyrolysate samples were collected. The first involved a sample of natural rubber which has china clay or barium carbonate as a filler. Because of the large amount of filler the rubber could not be analyzed by ATR methods. Pyrolysis was effected for 10 seconds at 900° C. and the smoke produced allowed to settle for about 2 minutes before the spectral analysis was made. The fillers did not interfere except that some carbon monoxide and carbon dioxide were produced but as in the case of the water vapor in the pyrolyzed epoxy resin the absorption bands for these gases are well known and did not interfere with the infrared spectrum produced. The second sample which was carried out in the same manner as described above involved natural rubber. An excellent infrared spectrum was produced with only small indications of carbon monoxide and carbon dioxide.

The third sample which was also obtained by the same procedure involved natural rubber with carbon filler. In this case the carbon monoxide and carbon dioxide bands were considerably more apparent but still did not interfere with an interpretation of the infrared spectrum produced.

The amount of smoke produced in the vapor phase pyrolysis tends to gradually blacken the walls of the plastic container and so after a few uses the container can be discarded as it is quite cheap. Of course, the container can be cleaned but the low cost of the plastic container makes this procedure ordinarily uneconomical.

We claim:

1. In an infrared spectral analysis system including a holder for a transmission cell positioned in the infrared beam of a spectrometer, the improvement which comprises a portable collecting cell of suitable dimensions for fitting into the cell holder of the spectrometer, the portable cell comprising in combination,
   (a) a base plate structure having mounted thereon an electric heater of dimensions suitable for receiving a sample to be pyrolyzed, the base plate having disengageable means for engaging a power supply for heating the electric heater,
   (b) a cover for the base plate enclosing the electric heater and of shape forming therewith a portable cell, and gasket means for maintaining the portable cell hermetically sealed against the atmosphere,
   (c) means in the base plate for removably connecting a portion of the base plate to a source of subatmospheric pressure, a conduit in the base plate connecting from said connecting means to the inside of a portable cell,
   (d) infrared transparent windows in the cover portion of the portable cell through which the infrared beam of the spectrometer passes when the portable cell is placed in the spectrometer, and
   (e) a valve in the base plate which, on closure, shuts off the interior of the portable cell from the removable means connecting the base plate to the source of subatmospheric pressure, whereby on closure of the valve the subatmospheric pressure within the portable cell is maintained after disconnection from the source of subatmospheric pressure.

2. A vapor phase pyrolyzate cell according to claim 1 in which the means for connecting the electric heater to the power supply consists of plug-in pins.

References Cited

UNITED STATES PATENTS

| 3,104,178 | 9/1963 | Da Silva | 118—49.1 X |
| 3,161,542 | 12/1964 | Ames et al. | 118—49.1 X |
| 3,036,549 | 5/1962 | Iwata et al. | 118—49.1 |
| 3,240,111 | 3/1966 | Sherman et al. | |
| 3,271,179 | 9/1966 | Smith | 118—49.1 X |
| 3,279,307 | 11/1966 | Wilks. | |
| 2,123,706 | 7/1938 | Biggs | 118—48 X |
| 2,237,328 | 4/1941 | Birdseye et al. | 118—48 X |
| 2,809,315 | 10/1957 | Townsend et al. | 118—49 X |
| 2,818,831 | 1/1958 | Vine | 118—49 |
| 2,879,740 | 3/1959 | Mahon et al. | 118—49 |
| 3,302,609 | 2/1967 | Wacker et al. | 118—49 |

OTHER REFERENCES

Fahrenfort, J. Spectrochimica Acta, vol. 18, pp. 1103–1108, March 1962.

JEWELL H. PEDERSEN, Primary Examiner

W. A. SKLAR, Assistant Examiner

U.S. Cl. X.R.

118—49.1